US012758471B2

(12) United States Patent
Boomsma

(10) Patent No.: US 12,758,471 B2
(45) Date of Patent: Oct. 13, 2026

(54) SIP TOP

(71) Applicant: LCeeeDesigns LLC, Lakeville, MN (US)

(72) Inventor: Leah Boomsma, Lakeville, MN (US)

(73) Assignee: LCeeeDesigns LLC, Lakeville, MN (US)

( * ) Notice: Subject to any disclaimer, the term of this patent is extended or adjusted under 35 U.S.C. 154(b) by 0 days.

(21) Appl. No.: 19/339,172

(22) Filed: Sep. 24, 2025

(65) Prior Publication Data

US 2026/0083639 A1 Mar. 26, 2026

Related U.S. Application Data

(60) Provisional application No. 63/698,143, filed on Sep. 24, 2024.

(51) Int. Cl.
*A61J 11/04* (2006.01)
*A47G 19/22* (2006.01)
*A61J 9/06* (2006.01)
*B65D 41/22* (2006.01)

(52) U.S. Cl.
CPC .......... *A61J 11/04* (2013.01); *A47G 19/2272* (2013.01); *A61J 9/0623* (2015.05); *B65D 41/22* (2013.01); *B65D 2251/08* (2013.01)

(58) Field of Classification Search
CPC ..... A61J 11/04; A61J 9/0623; A47G 19/2272; B65D 41/22; B65D 2251/08
USPC .......................................... 220/287, 318–320
See application file for complete search history.

(56) References Cited

U.S. PATENT DOCUMENTS

| | | | | | |
|---|---|---|---|---|---|
| 383,024 | A * | 5/1888 | Stork | B65D 41/22 | 220/366.1 |
| 2,070,377 | A * | 2/1937 | Simmons | B65D 51/165 | 215/320 |
| 2,745,569 | A * | 5/1956 | Seaman | A61J 9/08 | 215/396 |
| 3,977,451 | A * | 8/1976 | Duba | A63B 55/406 | 150/159 |
| 5,163,608 | A * | 11/1992 | Block | B42D 15/02 | 229/92.8 |
| 6,062,412 | A * | 5/2000 | Jacobsmeyer, Jr. | B65F 1/16 | 220/259.5 |
| 8,789,541 | B1 * | 7/2014 | Evans | B65D 81/113 | 132/73 |

(Continued)

*Primary Examiner* — James N Smalley
(74) *Attorney, Agent, or Firm* — Headland Law & Strategy; Matthew J. Smyth

(57) ABSTRACT

An elastomeric sip top may include a top surface and a side-wall structure. The top surface may have a nipple with an outer surface that extends upward from the top surface and that terminates in a nipple tip having a sealable aperture that extends from an exterior of the nipple tip to an inner cavity that is in fluid communication with the exterior when the nipple tip is deformed relative to a nominal state. The side-wall structure may have a top portion having a continuous circumference, a middle portion having two openings positioned opposite from each other, and a bottom portion having a front wall, a back wall and two side wings extending from opposite sides of the back wall. Each of the two side wings may have a fastening mechanism that cooperatively and releasably engages with corresponding fastening elements disposed on the front wall.

7 Claims, 3 Drawing Sheets

(56) References Cited

U.S. PATENT DOCUMENTS

| | | | | |
|---|---|---|---|---|
| 2012/0228318 | A1* | 9/2012 | Martin | A47G 23/0216 220/737 |
| 2014/0175104 | A1* | 6/2014 | Leonard | B44D 3/127 220/735 |
| 2015/0359365 | A1* | 12/2015 | Feeley | A47G 19/2272 220/713 |

* cited by examiner

SIP TOP

CROSS REFERENCE TO RELATED APPLICATIONS

This application claims priority to U.S. Application Ser. No. 63/698,143, titled "Sip Top," filed on Sep. 24, 2024. This application incorporates the entire contents of the foregoing application herein by reference.

TECHNICAL FIELD

Various implementations relate generally to sip tops for use with food or drink squeeze pouches.

BACKGROUND

Food or drink squeeze pouches may be prone to leak, particularly in the hands of young users.

SUMMARY

An elastomeric sip top may include a top surface and a side-wall structure. The top surface may have a nipple with an outer surface that extends upward from the top surface and that terminates in a nipple tip having a sealable aperture that extends from an exterior of the nipple tip to an inner cavity that is in fluid communication with the exterior when the nipple tip is deformed relative to a nominal state. In some implementations, the top surface has a generally elliptical shape. The side-wall structure may have a top portion having a continuous circumference, a middle portion having two openings positioned opposite from each other, and a bottom portion having a front wall, a back wall and two side wings extending from opposite sides of the back wall. Each of the two side wings may have a fastening mechanism that cooperatively and releasably engages with corresponding fastening elements disposed on the front wall. In some implementations, the top portion has a generally cylindroid form, and the middle portion has a generally cylindroid form.

The top portion may be configured to fit around a corresponding holder having an interior and two side handles. The two openings may be configured to receive the two side handles, and the side wings may be configured to be disposed under the two side handles and coupled to the fastening elements to secure the sip top to the holder. The inner cavity may be configured to receive a spout of a food or drink pouch, when the food or drink pouch is disposed in the interior and the elastomeric sip top is secured to the holder.

A system may include a holder and an elastomeric sip top. The holder may have a side wall that defines an interior that is configured to receive a squeeze pouch. The holder may include a handle extending from an exterior of the side wall. The elastomeric sip top may have (i) a top surface; (ii) a nipple having an outer surface that extends upward from the top surface and that terminates in a nipple tip having a sealable aperture that extends from an exterior of the nipple tip to an inner cavity that is in fluid communication with the exterior when the nipple tip is deformed relative to a nominal state; and (iii) a side-wall structure. The side-wall structure may have a top portion having a continuous circumference; a middle portion with an opening; and a bottom portion having a front wall, a back wall and a wing extending from the back wall and having a fastening mechanism that cooperatively and releasably engages with a corresponding fastening element disposed on the front wall. The top portion may be configured to fit around the holder—the opening may be configured to receive the handle, and the wing may be disposed under the handle and coupled to the fastening element to secure the sip top to the holder. The inner cavity may receive a spout of a food or drink pouch, when the food or drink pouch is disposed in the interior and the elastomeric sip top is secured to the holder.

DETAILED DESCRIPTION

Figure 1A:
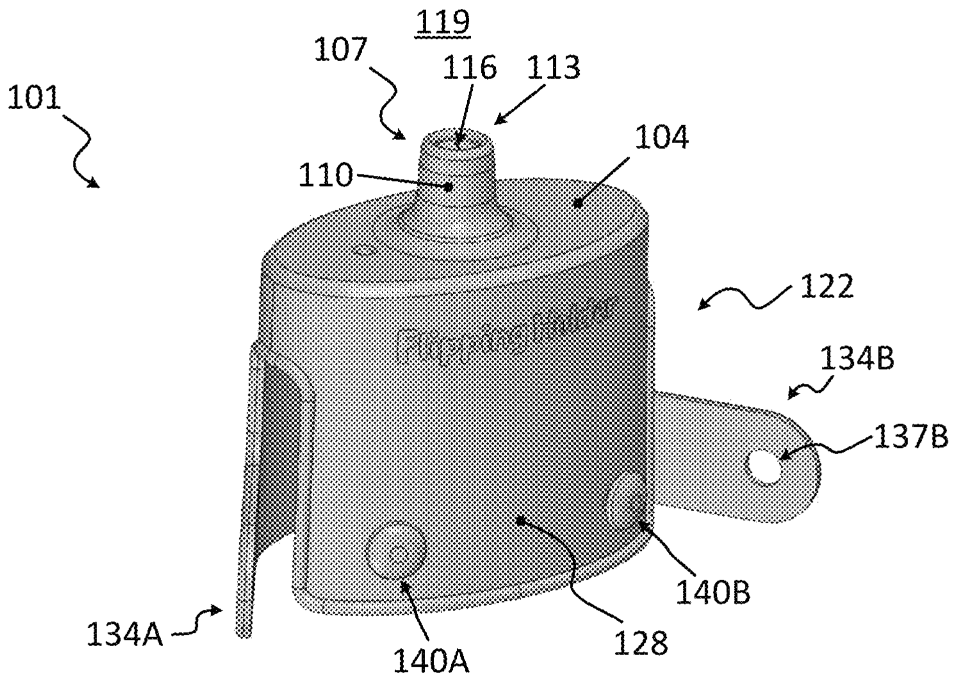
FIG. 1A illustrates an exemplary sip top.

FIG. 1A illustrates an exemplary sip top 101. In some implementations, the sip top 101 is made of an elastomeric material that is resilient, flexible, durable and suitable for contact with an infant or toddler's mouth—such as, for example, a food-grade silicone. As shown, the sip top 101 has a top surface 104, which, in some implementations, as shown, is elliptical in shape; in other implementations, the top surface 104 has another shape.

The top surface 104 has a nipple 107 with an outer surface 110 extending upward from the top surface 104. As shown, the nipple 107 terminates in a nipple tip 113 that has a sealable aperture 116 that extends from an exterior 119 of the nipple tip to an inner cavity (not shown) that is in fluid communication with the exterior 119 when the nipple tip 107 is deformed relative to a nominal state.

Figure 1B:
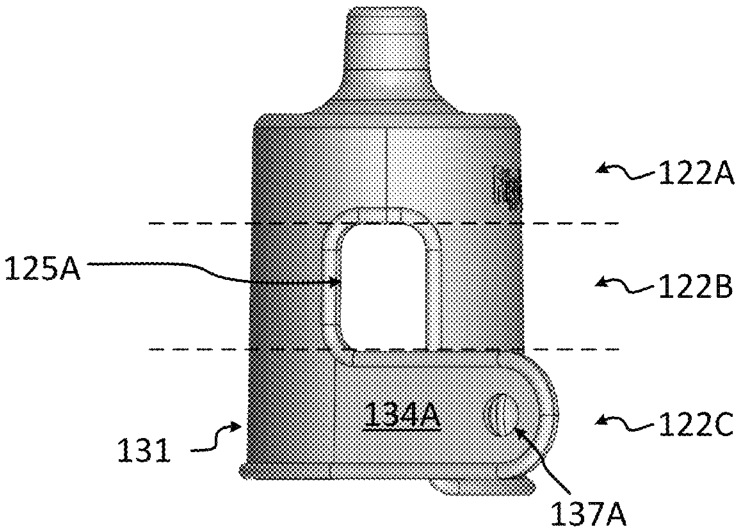
FIGS. 1B and 1C illustrate additional views of the exemplary sip top of FIG. 1A.
Figure 1C:
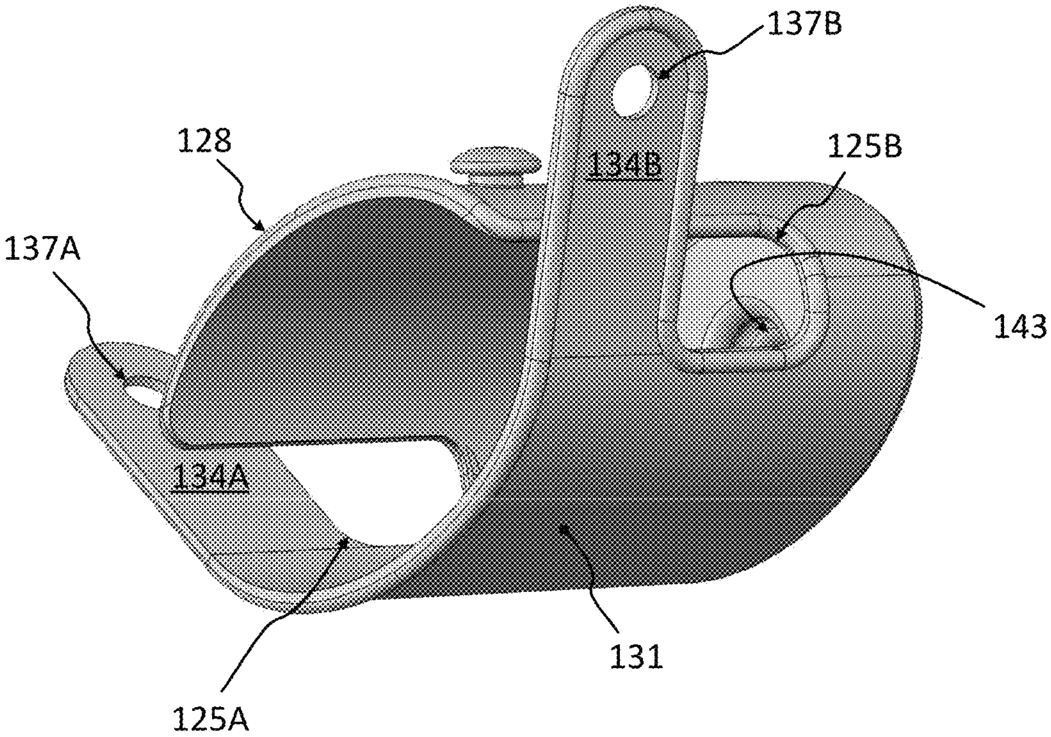

The sip top 101 has a side-wall structure 122, which, in some implementations, as shown, has a generally cylindroid shape and includes a number of discrete sections. In particular, with reference to FIGS. 1B and 1C, the side-wall structure 122 may have a generally cylindroid top portion 122A that has a continuous circumference; a generally cylindroid middle portion 122B that has two openings 125A and 125B (see also FIG. 1C) that may be positioned opposite from each other; and a bottom portion 122C having a front wall 128, a back wall 131 and two side wings 134A and 134B extending from opposite sides of the back wall 131.

Each of the two side wings 134A and 134B may have a fastening mechanism 137A or 137B that cooperatively and releasably engages with a corresponding fastening element 140A or 140B on the front wall 128. In some implementations, as shown, the fasting mechanism 137A and 137B and fastening elements 140A and 140B may be corresponding compression-fitting mechanisms (e.g., where an elastic and resilient opening is configured to receive an elastic and resilient element that is larger than a nominal dimension of the elastic and resilient opening—such that once the fastening mechanisms and fastening elements are coupled, a connection between the two is releasably maintained by the compression fitting). In other implementations, other coupling mechanisms may be employed, such as, for example, snaps, screws, hook-and-loop fasteners, magnets, elastic cords, etc.

Figure 2:
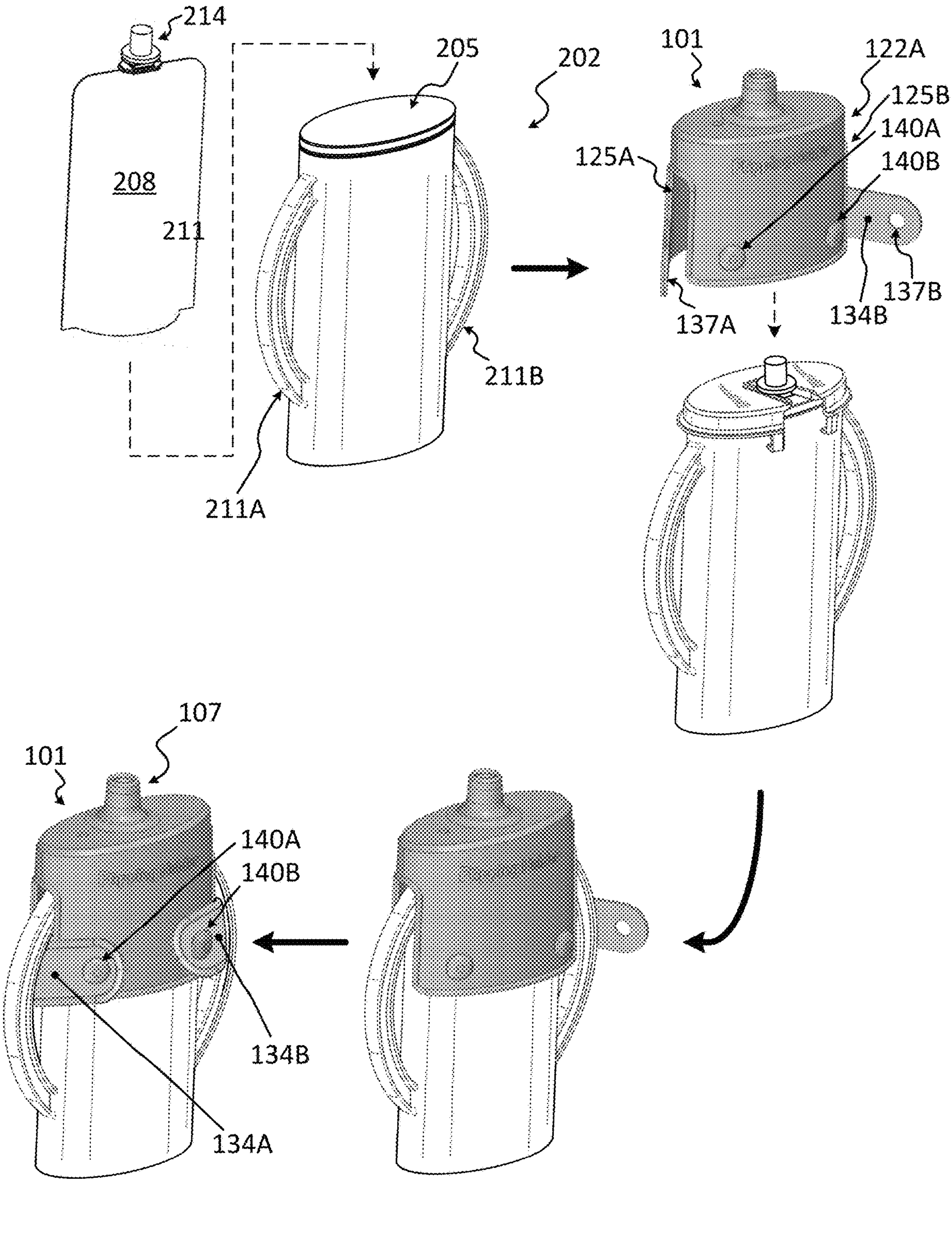
FIG. 2 illustrates an exemplary system.

In some implementations, as depicted in FIG. 2, the top portion 122A of the sip top 101 is configured to fit around a corresponding holder 202 having an interior 205 that is configured to receive a squeeze pouch 208 (e.g., one filled with a drink or flowable food, such as yogurt or apple sauce). In some implementations, such a holder 202 includes two side handles 211A and 211B; and the openings 125A and 125B may be configured to fit around the handles 211A and 211B. In some implementations, the fastening mechanisms 137A and 137B may be configured to be engaged with the corresponding fastening elements 140A and 140B when the top portion 122A is fit around the holder 202, and the side wings 134A and 134B are disposed under such handles 211A and 211B—so as to secure the top portion 122A onto the holder 202—as further depicted in FIG. 2.

In implementations, such as those described above and depicted in FIG. 2, an inner cavity 143 (see FIG. 1C) may receive a spout 214 (see FIG. 2) of the squeeze pouch 208, thereby sealing it off to prevent spills. In such configurations, food or drink may be released through the sip top 101 to a user, when the user deforms the nipple 107 (e.g., by biting it or gumming it while sucking), causing the sealable aperture 116 to open.

In some implementations, a system includes the elements shown in FIG. 2. For example, an exemplary system may include a holder 202 and an elastomeric sip top 101 having the features described with reference to the foregoing figures (e.g., a top surface 104, nipple, side wings 134A and 134B, fastening mechanism 137A and 137B, fastening elements 140A and 140B, etc.).

Several implementations have been described with reference to exemplary aspects, but it will be understood by those skilled in the art that various changes may be made and equivalents may be substituted for elements thereof without departing from the contemplated scope. For example, sip-top top surfaces may have shapes other than ellipses, including, for example, circles, rectangles, triangles, other polygons or irregular shapes; more or fewer side wings may be provided—for example, some implementations may include a single side wing, while others include two, three or more side wings; cylindroids are described, but the overall shape of the sip top or the holder may take the form of a cylinder, a rectangular or triangular prism, a pyramid, a cone, a frustrum, a pyramidal frustrum, etc.; one or more handles may be provided; a different mechanism may be used to secure the sip top under handles, or no closure mechanism may be used—for example, some implementations may employ a relatively more rigid hook or catch; the sip top may comprise a single unitary construction, or it may include multiple discrete components. "About," "approximately" or "substantially" may mean within 1%, or 5%, or 10%, or 20%, or 50%, or 100% of a nominal value.

Many other variations are possible, and modifications may be made to adapt a particular situation or material to the teachings provided herein without departing from the essential scope thereof. Therefore, it is intended that the scope include all aspects falling within the scope of the appended claims.

What is claimed is:

1. An elastomeric sip top, comprising:

a top surface having a generally elliptical shape, the top surface having a nipple with an outer surface that extends upward from the top surface and that terminates in a nipple tip having a sealable aperture that extends from an exterior of the nipple tip to an inner cavity that is in fluid communication with the exterior when the nipple tip is deformed relative to a nominal state; and a side-wall structure, the side-wall structure having a generally cylindroid top portion having a continuous circumference, a generally cylindroid middle portion having two openings positioned opposite from each other, and a bottom portion having a front wall, a back wall and two side wings extending from opposite sides of the back wall, each of the two side wings having a fastening mechanism that cooperatively and releasably engages with corresponding fastening elements disposed on the front wall.

2. The elastomeric sip top of claim 1, wherein the generally cylindroid top portion is configured to fit around a corresponding generally cylindroid holder having an interior and two side handles; wherein the two openings are configured to receive the two side handles, and wherein the side wings are configured to be disposed under the two side handles and coupled to the fastening elements to secure the sip top to the holder.

3. The sip top of claim 2, wherein the inner cavity is configured to receive a spout of a food or drink pouch, when the food or drink pouch is disposed in the interior and the elastomeric sip top is secured to the holder.

4. An elastomeric sip top, comprising:

a top surface having a nipple with an outer surface that extends upward from the top surface and that terminates in a nipple tip having a sealable aperture that extends from an exterior of the nipple tip to an inner cavity that is in fluid communication with the exterior when the nipple tip is deformed relative to a nominal state; and a side-wall structure, the side-wall structure having a top portion having a continuous circumference; a middle portion with an opening; and a bottom portion having a front wall, a back wall and a wing extending from the back wall and having a fastening mechanism that cooperatively and releasably engages with a corresponding fastening element disposed on the front wall.

5. The elastomeric sip top of claim 4, wherein the top portion is configured to fit around a corresponding holder having an interior and a side handle; wherein the opening is configured to receive the side handle, and wherein the wing is configured to be disposed under the side handle and coupled to the fastening element to secure the sip top to the holder.

6. The sip top of claim 5, wherein the inner cavity is configured to receive a spout of a food or drink pouch, when the food or drink pouch is disposed in the interior and the elastomeric sip top is secured to the holder.

7. A system comprising:

a holder with a side wall that defines an interior that is configured to receive a squeeze pouch, the holder comprising a handle extending from an exterior of the side wall; and an elastomeric sip top having (i) a top surface; (ii) a nipple having an outer surface that extends upward from the top surface and that terminates in a nipple tip having a sealable aperture that extends from an exterior of the nipple tip to an inner cavity that is in fluid communication with the exterior when the nipple tip is deformed relative to a nominal state; and (iii) a side-wall structure;

wherein the side-wall structure has a top portion having a continuous circumference; a middle portion with an opening; and a bottom portion having a front wall, a back wall and a wing extending from the back wall and having a fastening mechanism that cooperatively and releasably engages with a corresponding fastening element disposed on the front wall;

wherein the top portion is configured to fit around the holder; wherein the opening is configured to receive the handle, and wherein the wing is disposed under the handle and coupled to the fastening element to secure the sip top to the holder; and wherein the inner cavity receives a spout of a food or drink pouch, when the food or drink pouch is disposed in the interior and the elastomeric sip top is secured to the holder.

* * * * *